(12) United States Patent
Nakamura

(10) Patent No.: US 6,714,681 B1
(45) Date of Patent: Mar. 30, 2004

(54) DECODING APPARATUS AND METHOD

(75) Inventor: Hitoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/364,827

(22) Filed: Jul. 30, 1999

(30) Foreign Application Priority Data

Jul. 31, 1998 (JP) .......................... 10-218115

(51) Int. Cl.[7] .............................. G06K 9/36; G06K 9/46
(52) U.S. Cl. ...................... 382/233; 382/235; 382/236; 382/248; 348/14.13; 345/555
(58) Field of Search ................................. 382/235, 236, 382/243, 244, 251, 232, 233, 234, 240, 239, 245, 248, 249, 252; 358/426.11, 426.12, 426.13, 426.04, 426.07; 348/14.13, 439.1, 568; 345/555; 341/65, 67, 51, 59; 375/240.16, 240.25, 240.27, 254

(56) References Cited

U.S. PATENT DOCUMENTS

| | | | | |
|---|---|---|---|---|
| 5,093,720 A | * | 3/1992 | Krause et al. | 358/133 |
| 5,367,629 A | * | 11/1994 | Chu et al. | 395/162 |
| 5,576,765 A | * | 11/1996 | Cheney et al. | 348/407 |
| 5,699,128 A | * | 12/1997 | Hayashi | 348/699 |
| 5,761,480 A | * | 6/1998 | Fukada et al. | 395/500 |
| 5,818,533 A | * | 10/1998 | Auld et al. | 348/412 |
| 5,847,762 A | * | 12/1998 | Canfield et al. | 348/415 |
| 5,872,531 A | * | 2/1999 | Hohnson et al. | 341/110 |
| 5,896,203 A | * | 4/1999 | Shibata | 358/404 |
| 6,028,635 A | * | 2/2000 | Owen et al. | 348/403 |
| 6,243,139 B1 | * | 6/2001 | Takahashi et al. | 348/420 |

* cited by examiner

Primary Examiner—Timothy M. Johnson
Assistant Examiner—Yosef Kassa
(74) Attorney, Agent, or Firm—Frommer Lawrence & Haug LLP; William S. Frommer (57) ABSTRACT

A decoding apparatus and method capable of improving the functionality and simplifying the constitution are realized. The decoding apparatus comprises compressing means for compressing image data decoded by the decoding means to be supplied to storing means and extending means for extending the image data compressed by the compressing means which has been stored in the storing means to be supplied to the decoding means. Also, the decoding method comprises a first step for storing the image data decoded by decoding processing in the storing means and a second step for reading and extending the compressed image data stored in the storing means and for decoding the encoded data based on the extended image data.

22 Claims, 7 Drawing Sheets

FIG.11A — PIXEL SEQUENCE BEFORE DECOMPRESSION

⇓ DECOMPRESSION

FIG.11B — PIXEL SEQUENCE AFTER DECOMPRESSION

DECODING APPARATUS AND METHOD

BACKGROUND OF THE INVENTION

1. Field of the Invention

The present invention relates to a decoding apparatus and method, and more particularly, is applicable to a decoding apparatus and method for decoding video data compressive-encoded by the moving picture experts group phase 2 (MPEG2) system.

2. Description of the Related Art

Various compressive-encoding systems have been proposed as a method of reducing the amount of video data. The MPEG2 system has been especially used widely. The MPEG2 standard is practically the international standard which intends to provide the general-purpose encoding of video data and audio data. The MPEG2 standard has been used in many fields such as broadcasting, communication, and storage medium.

In the MPEG2 standard, five profiles (functionality) and four levels (size of image, etc.) are provided as typical specifications to keep the mutual compatibility of bit stream. The most useful profile and level are set as main profile and main level, respectively.

In the MPEG2 standard, there is generally no provision with respect to the concrete contents for decoding the compressive-encoded video data and with respect to the memory size needed at a decoding side. These practically depend on the setting of the profile and level by which the image data was encoded. More specifically, at a decoding apparatus side, for the size of a buffer memory for storing input signals temporally or the size of a frame memory used for storing reference image data and rearranging decoded images, suitable value for decoding without the occurrence of error is determined by the profile and level in encoding.

However, in the MPEG2 standard, as the level of the video data in encoding becomes higher, the number of pixels in the horizontal direction and the vertical direction operated in decoding increases. For this reason, in the decoding apparatus for decoding the video data encoded with high level of the MPEG2, there is a problem that the required size of frame memory for storing reference image data and rearranging images becomes larger in addition to the necessity of high-speed decoding circuit, so that the manufacturing cost becomes expensive.

As one method of solving the above problem, a decoding method has been proposed conventionally, the decoding method in which a decoding processing such as the variable-length decoding and the inverse discrete cosine transform (DCT) is changed in its processing contents so as to decode the video data, which has been compressive-encoded with the main-profile-at-high-level of the MPEG2 Standard, with the memory size and operation speed of the main-profile-at-main-level.

However, this decoding method has a problem that another circuit which is different from the original decoding circuit is newly needed since the method itself differs from the pure decoding processing of the MPEG2, so that the design cost and manufacturing cost are required for this.

Further, this decoding method has a problem of low functionality, such like that the high-leveled encoded data that the higher operation speed and larger memory size are further required can not be decoded, reproduced and output with the required quality while keeping the high level.

Accordingly, in the decoding apparatus, if the encoded data from high level to low level can be decoded surely without change of the decoding contents while reducing the size of the frame memory for storing reference image data and for rearranging images as much as possible, the above-described problems are all solved and the decoding apparatus which has high functionality, simple construction, and low manufacturing cost may be constructed.

SUMMARY OF THE INVENTION

In view of the foregoing, an object of this invention is to provide a decoding apparatus and method which can improve the functionality and simplify the construction.

The foregoing object and other objects of the invention have been achieved by the provision of a decoding apparatus which comprises a compressing means for compressing the image data decoded by a decoding means and supplying it to storing means, and a decompression (referred to interchangeably as "extending") means for decompressing the compressed image data stored in the storing means and supplying the decompressed image data to the decoding means.

As a result, the decoding apparatus can avoid the complication of the whole construction and can perform the decoding processing from high level to low level while reducing the size of the storing means efficiently, since the decoded image data is compressed and then stored in the storing means.

Further, according to this invention, the decoding method comprises a first step of compressing the image data obtained by decoding the encoded data and storing it in the storing means, and a second step of reading and extending the compressed image data stored in the storing means and decoding the encoded data based on the extended image data.

As a result, the decoding method can deal with the decoding processing from high level to low level while reducing the size of the storing means efficiently, since the decoded image data is compressed and then stored in the storing means.

The nature, principle and utility of the invention will become more apparent form the following detailed description when read in conjunction with the accompanying drawings in which like parts are designated by like reference numerals or characters.

DETAILED DESCRIPTION OF THE EMBODIMENT

Figure 1:
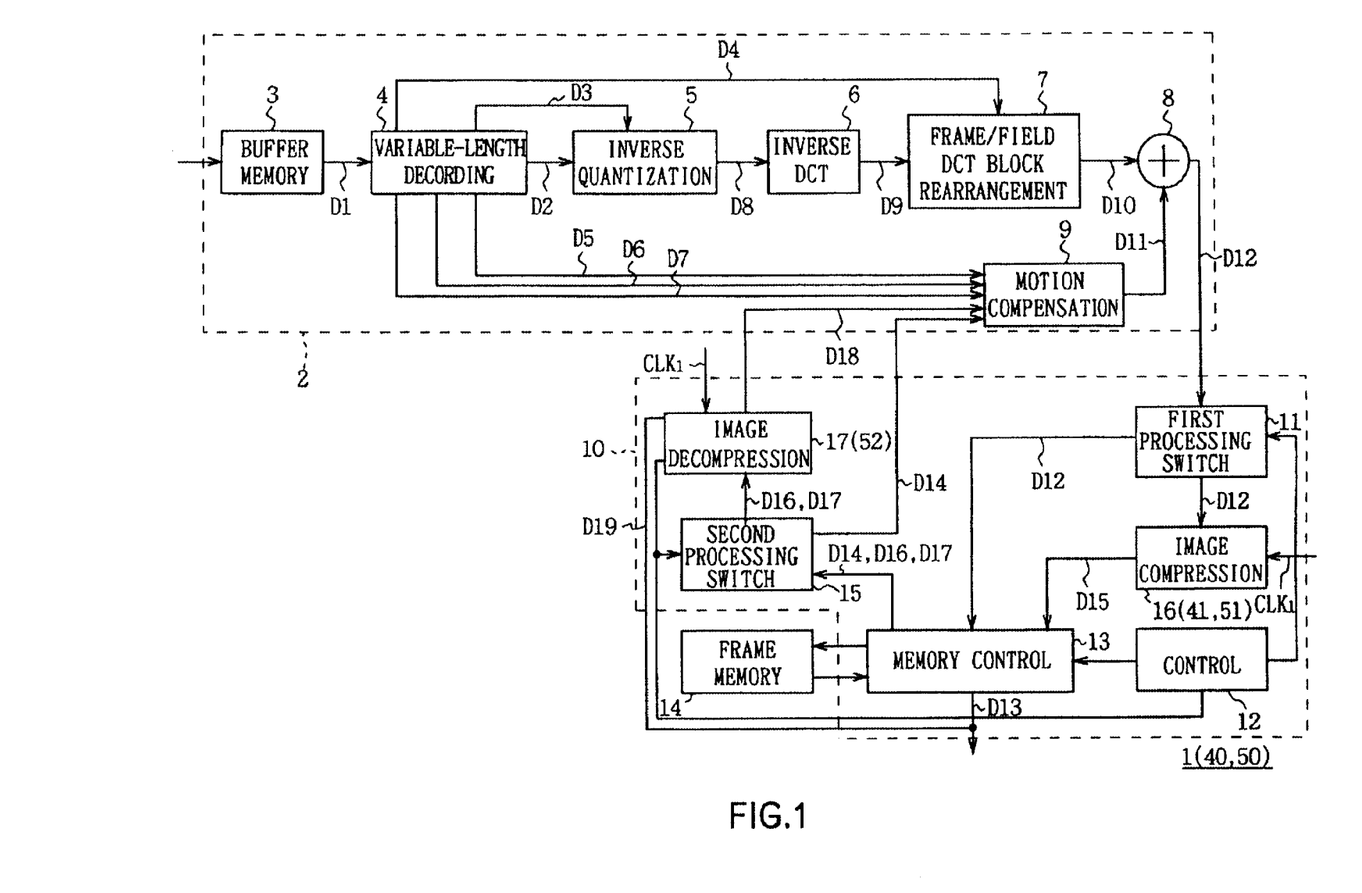
FIG. 1 is a block diagram showing the constitution of the decoding-apparatus according to the first to third embodiments.

Preferred embodiments of this invention will be described with reference to the accompanying drawings:

(1) The First Aspect of the Implementation (1-1) The Constitution of the Decoding Apparatus According to the First Embodiment In FIG. 1, symbol 1 denotes a decoding apparatus according to the first embodiment as a whole. Encoded data D1, which is video data, is compressive-encoded based on the MPEG2 standard and supplied to a variable-length decoding processing unit 4 via a buffer memory 3 of a decoding part 2.

The variable-length decoding processing unit 4 variable-length-decodes the supplied encoded data D1, and outputs the obtained quantization data D2 and quantization scale data representing the quantization scale value of the quantization data D2 to an inverse quantizing processing unit 5.

The variable-length decoding processing unit 4 further outputs, to a frame/field DCT block rearrangement processing unit 7, frame/field DCT flag data D4 being frame/field DCT flag representing that either frame unit or field unit is used to perform the DCT processing. At the same time, the variable-length decoding processing unit 4 outputs prediction mode data D5 representing prediction mode for each macro-block (16 pixels×16 lines), motion vector data D6, and frame/field prediction flag representing that either of frame unit or field unit is used to perform the motion compensation prediction, to a motion compensation processing unit 9.

The inverse quantization processing unit 5 inversely quantizes the supplied quantization data D2 per eight pixels×eight lines block (hereinafter, referred to as block simply) for each macro-block based on the quantization scale data D3, and outputs the obtained DCT coefficient data D8 to an inverse DCT processing unit 6.

The inverse DCT processing unit 6 successively performs the inverse DCT processing on the supplied DCT coefficient data D8 per block for each macro-block so as to obtain difference data D9 being differential value with respect to the motion compensation prediction image for all macro-blocks in one picture, and outputs this to the frame/field DCT block rearrangement processing unit 7.

The frame/field DCT block rearrangement processing unit 7, based on the frame/field DCT flag data D4 supplied from the variable-length decoding processing unit 4, performs on the supplied difference data D9 a block rearrangement processing which reconstructs a block suitable for the motion compensation processing per macro-block if necessary, and outputs the obtained rearranged difference data D10 to an addition processing unit 8.

To the addition processing unit 8, no data is supplied from the motion compensation processing unit 9 when I-picture (intraframe encoded image) is being processed, and on the contrary, the video data of the motion compensation prediction image (hereinafter, referred to as motion compensation prediction image data) is supplied from the motion compensation processing unit 9 per block for each macro-block when P-picture (interframe successive direction predictive encoded image) or B-picture (bidirection predictive encoded image) is being processed.

When the I-picture is being processed at the time, the addition processing unit 8 outputs the rearranged difference data D10 supplied from the frame/field DCT block rearrangement processing unit 7 as it is as decoded image data D12 to a first processing switch unit 11 of an image storage and output processing part 10. On the contrary, when the P-picture or B-picture is being processed at the time, the addition processing unit 8 successively adds the rearranged difference data D10 supplied from the frame/field DCT block rearrangement processing unit 7 and the motion compensation prediction image data D11 supplied from the motion compensation processing unit 9 to obtain the image data of the decoded image which is motion-compensated, and outputs this to the first processing switch unit 11 of the image storage and output processing part 10 as decoded image data D12.

Here, two operation modes, the normal mode and the compression mode, are provided in the image storage and output processing part 10. In the normal mode, the first processing switch unit 11 outputs the supplied decoded image data D12 to a memory control processing unit 13 as it is under the control of a control unit 12.

The memory control processing unit 13 successively stores the supplied decoded image data D12 at the corresponding address position in the frame memory 14 under the control of the control unit 12, and simultaneously, reads out the decoded image data D12 having the original arrangement of image before encoding at a predetermined timing to output this outside as reproduced image data D13.

At this time, when the picture being processed is the P-picture or B-picture, the motion compensation processing unit 9, based on the prediction mode data D5, the motion vector data D6, and the frame/field prediction flag data D7 supplied from the variable-length decoding processing unit 4, successively calculates to obtain that each macro-block reconstructed in the frame/field DCT block rearrangement processing unit 7 has the correlation with which macro-block of the corresponding I-picture or P-picture stored in the frame memory 14. Based on the calculated result, the memory control processing unit 13 is controlled.

As a result, the memory control processing unit 13 successively reads out the data of the corresponding macro-block of the corresponding I-picture or P-picture stored in the frame memory 14 per block, and outputs this to a second processing switch unit 15 as reference image data D14.

The second processing switch unit 15 outputs the reference image data D14 to the motion compensation processing unit 9 as it is under the control of the control unit. The motion compensation processing unit 9 performs a motion-compensation processing on the reference image data D14 supplied from the second processing switch unit 15 so as to generate motion compensation prediction image data D11 described above, and outputs this to the addition processing unit 8.

On the other hand, in the compression mode, the first processing switch unit 11 outputs the decoded image data D12 supplied from the addition processing unit 8 to the image compression processing unit 16 under the control of the control unit 12. The image compression processing unit 16 then performs predetermined compression processing to reduce the data size on the supplied decoded image data D12, and outputs the obtained compressive decoded image data D15 to the memory control processing unit 13.

The memory control processing unit 13 stores the supplied compressive decoded image data D15 at the corresponding address position in the frame memory 14 under the control of the control unit 12. At the same time, the memory control processing unit 13 also reads out from the frame memory 14 the compressive decoded image data D15 of the reference image necessary for the motion compensation processing under the control of the motion compensation processing unit 9 in the same manner as in the above-mentioned normal mode, and outputs this to the second processing switch unit 15 as compressive reference image data D16. Further, the memory control processing unit 13, in addition to the compressive reference image data D16, time-divisionally reads out the compressive decoded image data D15 to be output to outside having the original arrangement of image before encoding from the frame memory 14 together with the compressive-reference video data D16, and outputs this to the second processing switch unit 15 as outside output compressive image data D17.

The second processing switch unit 15, in the compression mode, outputs the supplied compressive reference image data D16 and the outside output image data D17 to the image extension processing unit 17, under the control of the control unit 12.

The image decompression (or "extension") processing unit 17 time-divisionally decompresses ("extends") the supplied compressed reference image data D16 and the outside output compressive image data D17. The image data obtained by decompressing the compressed reference image data D16 is output to the motion compensation processing unit 9 as reference image data D18, and the image data obtained by decompressing the outside output compressive image data D17 is externally output as reproduction image data D19.

The motion compensation processing unit 9 then performs a motion-compensation processing based on the reference image data D18 supplied from the image extension processing unit 17 to generate the motion compensation prediction image data D11 described above, and outputs this to the addition processing unit 8.

In this way, in the image storage and output processing part 10, in the compression mode, the decoded image data D12 is compressed to be stored in the frame memory 14, and the decoded image data D12 (compressive reference image data D16) is extended to be used for the motion compensation processing and is output to the outside.

(1-2) The Composition of the Image Compression Processing Unit 16 and the Image Extension Processing Unit 17

Figure 2A:
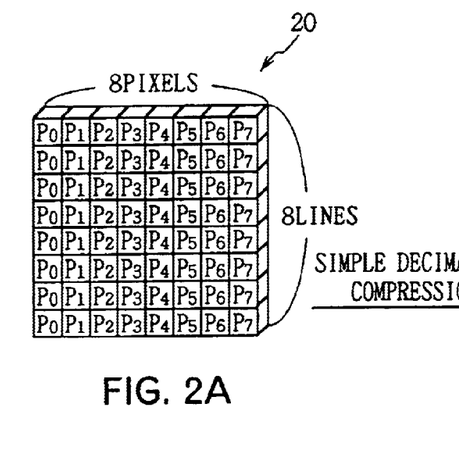
FIGS. 2A and 2B are concept diagrams explaining the image compression processing in accordance with the simple decimating method.

Here, in the MPEG2 system, each macro-block is composed of a plurality of eight pixels×eight lines blocks 20 as shown in FIG. 2A. Practically, in the main profile of the MPEG2, the ratio of the number of pixels of Y (luminance): U (color difference): V (color difference) is 4:2:0 so that one macro-block is composed of six (=4+2+0) blocks 20.

In the image compression-processing unit 16 according to the first embodiment, with respect to each block 20, the pixel data of the horizontal even-numbered pixels $P_0$, $P_2$, $P_4$, $P_6$ are decimated from the decoded image data D12 so that the number of pixels in the horizontal direction is reduced to ½. Thus, the size of the-decoded image data D12 is totally compressed to a half.

Figure 3:
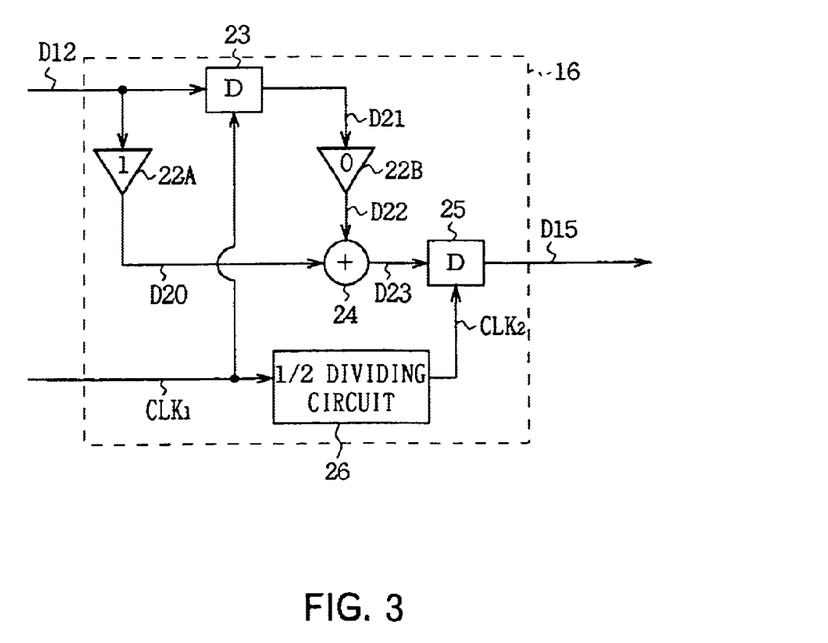
FIG. 3 is a block diagram showing the constitution of the image compression processing unit according to the first embodiment.

More specifically, the image compression processing unit 16 is composed as shown in FIG. 3. The decoded image data D12 supplied from the first processing switch unit 11 is input to a first multiplying circuit 22A and a first delay circuit 23.

The first multiplying circuit 22A multiplies the successively supplied pixel data of pixels $P_0$ to $P_7$ of each block 20 by the coefficients "1" with respect to the supplied decoded image data D12, and outputs the multiplied result to an adding circuit 24 as the first multiplied data D20.

The first delay circuit 23 delays the supplied decoded image data D12 by one clock of reference clock $CLK_1$ supplied from a block source which is not shown in the figure per pixel, thereafter this is output to a second multiplying circuit 22B as the delayed decoded image data D21.

The second multiplying circuit 22B multiplies the supplied delayed decoded image data D21 by the coefficients "0" per pixel, and the multiplied result is output to the adding circuit 24 as the second multiplied data D22.

The adding circuit 24 adds the first multiplied data D20 supplied from the first multiplying circuit 22A and the second multiplied data D22 supplied from the second multiplying circuit 22B, so as to obtain the added data D23 and output this to a second delay circuit 25.

The second delay circuit 25, based on the supplied added data D23, selectively and successively stores the pixel data of the even-numbered pixels $P_0$, $P_2$, $P_4$, $P_6$ of the horizontal pixels $P_0$ to $P_7$ for each block 20, and successively reads out the stored pixel data, based on a read clock $CLK_2$ which is obtained by dividing the reference clock $CLK_1$ supplied from a ½ dividing circuit 26 into ½ cycle.

Figure 2B:
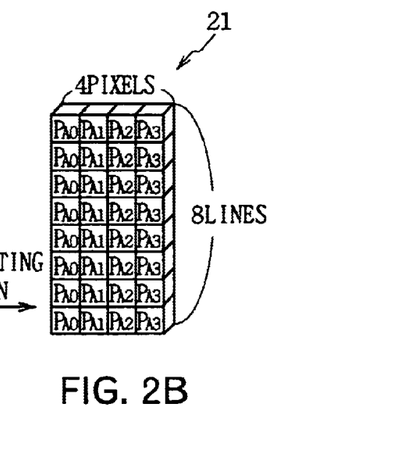

As a result, based on the data of each eight pixels×eight lines block 20 as shown in FIG. 2A, the data of four lines×eight lines block 21 as shown in FIG. 2B in which the pixel data of the horizontal odd-numbered pixels $P_1$, $P_3$, $P_5$, $P_7$ are successively decimated for each block 20 is output from the second delay circuit 25. This is output to the memory control processing unit 13 (FIG. 1) as the compressive decoded image data D15.

Figure 4A:
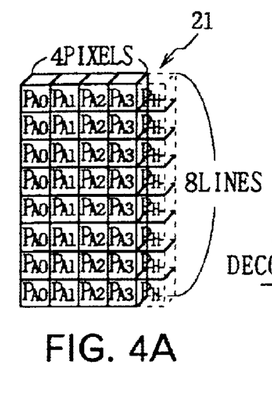
FIGS. 4A and 4B are concept diagrams explaining the image extension processing in accordance with the simple extending method.

On the other hand, in the image extension processing unit 17, with respect to the compressive reference image data D16 and the outside output compressive image data D17 supplied from the second processing switch unit 15, the pixel data of the horizontal pixels $P_{A0}$, $P_{A1}$, $P_{A2}$, $P_{A3}$ of each four lines×eight lines block 21 as shown in FIG. 4A which constitutes the macro-block after compression, are respectively read twice (simple extension processing) so as to extend the number of horizontal pixels for each block 21 to be doubled.

Figure 5:
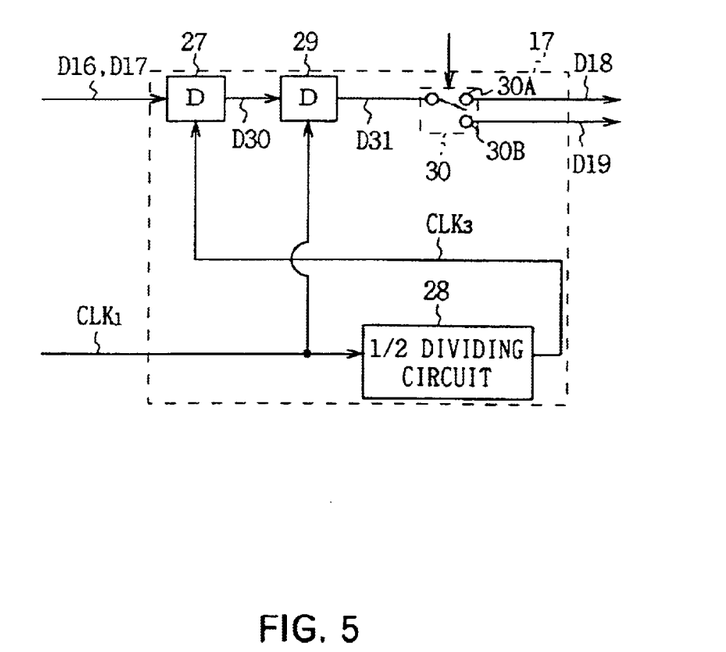
FIG. 5 is a block diagram showing the constitution of the image extension processing unit according to the first and second embodiments.

More specifically, the image extension processing unit 17 has the composition as shown in FIG. 5. The compressive reference image data D16 and the outside output compressive image data D17 time-divisionally supplied from the second processing switch unit 15 are input to a first delay circuit 27.

The first delay circuit 27 delays the supplied compressive reference image data D16 and the outside output compressive image data D17 by each one clock of the read clock $CLK_3$ per pixel, based on the read clock $CLK_3$ which is obtained by dividing the reference clock CLK, supplied from the above-mentioned clock source into ½ cycle at a ½ dividing circuit 28, and outputs this to a second delay circuit 29 as the delayed image data D30.

Figure 4B:
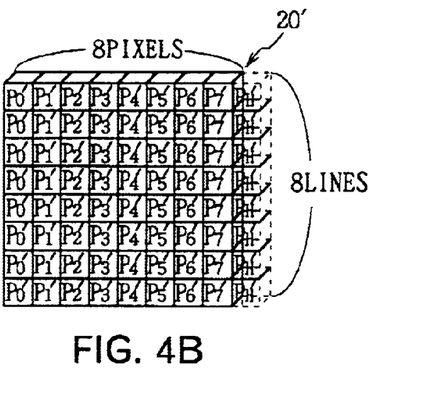

The delay circuit 29 successively stores the supplied delayed image data D30 and successively reads out this per pixel based on the reference clock $CLK_1$. As a result, the pixel data of the horizontal pixels $P_{A0}$, $P_{A1}$, $P_{A2}$, $P_{A3}$ of each block 21 shown in FIG. 4A which constitutes the compressive reference image data D16 and the outside output compressive image data D17, are respectively read twice. Then, the generated data of eight pixels×eight lines block 20' as shown in FIG. 4B is output to a switch circuit 30 as the extended image data D31.

The switch circuit 30 selects a first switch terminal 30A or a second switch terminal 30B under the control of the control unit, so that the extended image data D31 that the compressive reference image data D16 is extended is selectively output from the first switch terminal 30A as the reference image data D18, and the extended image data D31 that the outside output compressive image data D17 is extended is selectively output from the second switch terminal 30B as the reproduced image data D19.

In addition, in the case where the Half pel calculation is executed in the motion compensation processing, the pixel data of the pixel $P_H$ comprising the first pixel of the adjacent block 21 indicated by a broken line in FIG. 4A is sparely read out from the frame memory 14 for each horizontal direction of each block 21. This is supplied to the image extension processing unit 17 through the memory control processing unit 13 and the second processing switch unit 15.

The pixel data of the pixel $P_H$ is then supplied to the switch circuit 30 through the first and second delay circuits 27, 29 of the image extension processing unit 17 as described above, and is output from the first switch terminal 30A of the switch circuit 30.

Accordingly, in this case, the data of nine pixels×eight lines block 20' as shown in FIG. 4B is generated from the data of five lines×eight lines block 21 as shown in FIG. 4A in the image extension processing unit 17. This is output to the motion compensation processing unit 9 (FIG. 1) as the above-mentioned reference image data D18.

(1-3) Operation and Effects of the Embodiment

In the above constitution, in the decoding apparatus 1, in the normal mode, the decoded image data D12 being the image data decoded is stored in the frame memory 14 as it is to be used for the motion compensation processing, and is read out with the original rearrangement of image to be output to the outside as the reproduced image data D13. On the other hand, in the compression mode, the decoded image data D12 is compressed and stored in the frame memory 14, and extended to be used for the motion compensation processing, and is read out with the original rearrangement of image and extended, thereafter this is output to the outside as the reproduced image data D19.

Accordingly, in the decoding apparatus 1, when the high-leveled encoded data D1 is supplied, the decoded reproduction data D12 derived from the encoded data D1 is compressed and stored in the frame memory 14, thereby a memory having a half size of a memory corresponding to the high-profile-at-high-level of the MPEG2 standard can be used as the frame memory 14. Therefore, the manufacturing cost can be reduced.

Further, in the decoding apparatus 1, also in the case where the decoded reproduction data D12 that the encoded data D1 is decoded is compressed and stored in the frame memory 14 when the high-leveled encoded data D1 is supplied, the decoded reproduction data D12 is extended and output to the outside, so that the high-leveled encoded data can be reproduced with the high-level while keeping the desired quality.

Further, in the decoding apparatus 1, the high-leveled encoded data D1 can be also decoded with the contents of the decoding processing in accordance with the normal MPEG2 standard, so that the whole constitution of the apparatus can be simplified comparing to the case where the decoding processing according to, e.g., the down-decoding processing, is performed.

With the above constitution, the decoded image data D12 that the image data is decoded is compressed if necessary and stored in the frame memory 14, and at the same time, the compressed reproduction image data D12 stored in the frame memory 14 is extended to be used for the motion compensation processing, and output to the outside. Thereby, the whole constitution of the apparatus can be prevented from being complicated, and the encoded data D1 from high-level to low-level can be decoded while reducing the size of the frame memory efficiently. Therefore, the decoding apparatus which can improve the functionality and simplify the constitution can be realized.

(2) The Second Aspect of the Implementation (2-1) The Constitution of the Decoding Apparatus According to the Embodiment In FIG. 1, symbol 40 shows a decoding apparatus according the second embodiment as a whole, which has the same constitution as the decoding apparatus 1 according to the first embodiment, excepting the composition of the image compression processing unit 41.

Figure 6A:
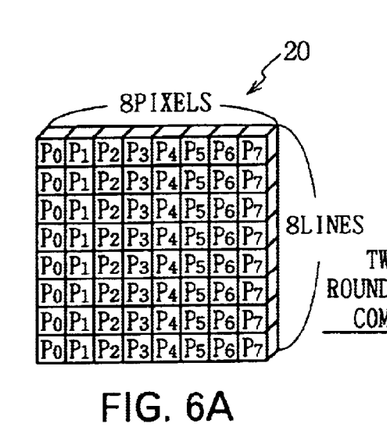
FIGS. 6A and 6B are concept diagrams explaining the image compression processing in accordance with the two-pixel round averaging method.

In this case, in the image compression processing unit 41 according to the second embodiment, with respect to the eight pixels×eight lines block 20 as shown in FIG. 6A which constitutes a macro-block, the two-pixel round average value between the pixel data value of the horizontal even-numbered pixels $P_0$, $P_2$, $P_4$, $P_6$ and the pixel data value of the odd-numbered pixels $P_1$, $P_3$, $P_5$, $P_7$ is obtained, and the obtained average value is calculated as a typical value of the corresponding two pixels $P_0$ and $P_1$, $P_2$ and $P_3$, $P_4$ and $P_5$, $P_6$, and $P_7$.

Note that the two-pixel round average value $A_V$ in this case is defined by the following equation, where the pixel data value of the even-numbered pixels $P_0$, $P_2$, $P_4$, $P_6$ is $\alpha$, and the pixel data value of the odd-numbered pixels $P_1$, $P_3$, $P_5$, $P_7$ is $\beta$.

$$Av = \frac{(\alpha + \beta + 1)}{2} \tag{1}$$

Figure 6B:
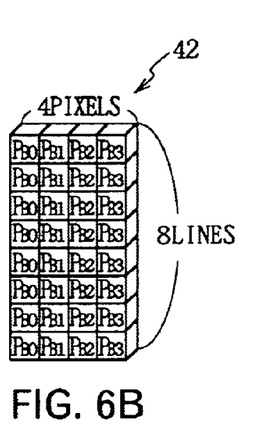

Thus, in the image compression processing unit 41 according to the second embodiment, the data of four lines×eight lines block 42 as shown in FIG. 6B can be generated from the data of each block 20 obtained based on the supplied decoded image data D12. This is output to the frame memory control processing unit 13 as the above-mentioned compressed reproduction image data D15.

Figure 7:
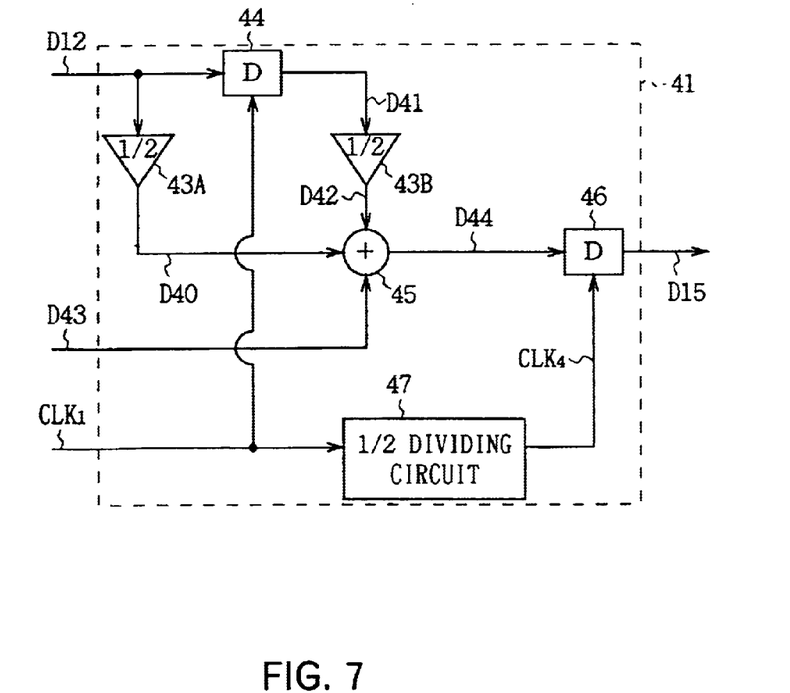
FIG. 7 is a block diagram showing the constitution of the image compression processing unit according to the second embodiment.

Practically, the image compression processing unit 41 according to the second embodiment is constituted as shown in FIG. 7. The supplied decoded image data D12 is input to a first multiplying circuit 43A and a first delay circuit 44.

In the first multiplying circuit 43A, the supplied decoded image data D12 is multiplied by the coefficients "½", and the obtained first multiplied data D40 is output to an adding circuit 45. The first delay circuit 44 delays the supplied decoded image data 12 by one clock of the reference clock $CLK_1$ per pixel based on the reference clock $CLK_1$ supplied from the clock source, thereafter this is output to a second multiplying circuit 43B as the delayed decoded image data D41.

The second multiplying circuit 43B multiplies the supplied delayed image data D41 by the coefficients "½", and the obtained second multiplied data D42 is output to the adding circuit 45.

At this time, the rounding data D43 having the value "½" is given to the adding circuit 45, so that the adding circuit 45 successively adds the first multiplied data D40 supplied from the first multiplying circuit 43A, the second multiplied data D42 supplied from the second multiplying circuit 43B, and the rounding data D43 per pixel. The obtained added data D44 is output to a second delay circuit 46.

The second delay circuit 46 selectively and successively stores two-pixel round average value data which are obtained by round-averaging each pixel data of the even-numbered and odd-numbered successive two pixels $P_0$ and $P_1$, $P_2$ and $P_3$, $P_4$ and $P_5$, $P_6$ and $P_7$, among two-pixel round average value data which are obtained by round-averaging the pixel data of adjacent horizontal two pixels $P_0$ and $P_1$, $P_1$ and $P_2$, $P_2$ and $P_3$, $P_3$ and $P_4$, $P_4$ and $P_5$, $P_5$ and $P_6$, $P_6$ and $P_7$ of each block 52 as shown in FIG. 6A which are obtained based on the supplied added data D44. The stored pixel data are successively read out based on the read clock $CLK_4$ that the reference clock $CLK_1$ supplied from a ½ dividing circuit 47 is divided into ½ cycle.

As a result, from the second delay circuit 46, the data of four lines×eight lines block 42 as shown in FIG. 6B which is obtained by round-averaging the horizontal even-numbered pixels $P_0$, $P_2$, $P_4$, $P_6$ and the successive odd-numbered pixels $P_1$, $P_3$, $P_5$, $P_7$ for each block 20 is output, based on the data of each eight pixels×eight lines block 20 as shown in FIG. 6A. This data is output to the memory control processing unit 13 (FIG. 1) as the above-mentioned compressed decoded image data D15.

In this way, in the image compression processing unit 41, the data size of the decoded image data D12 is reduced to a half per block, so that the decoded image data D12 can be compressed totally to ½ in the data size.

(2-2) Operation and Effects of the Embodiment

In the above constitution, in the decoding apparatus 40, in the normal mode, the decoded image data D12 being the image data decoded is stored in the frame memory 14 as it is to be used for the motion compensation processing, and is read out with the original arrangement of image to be output to the outside as the reproduced image data D13. On the other hand, in the compression mode, the decoded image data D12 is compressed by the two-pixel averaging processing and stored in the frame memory 14, and extended to be used for the motion compensation processing, and is read out with the original arrangement of image and extended, thereafter this is output to the outside as the reproduced image data D19.

Accordingly, in the decoding apparatus 40, as the same as the decoding apparatus of the first embodiment, the whole constitution of the apparatus can be prevented from being complicated, and the encoded data D1 from high level to low level can be decoded while reducing the size of the frame memory 14 efficiently.

Further, in the decoding apparatus 40, the two-pixel averaging method is used as a method of compressing the decoded image data D12 in the image compression processing unit 41, so that the picture quality of the reproduced image after extension can be improved comparing to the case where the simple decimating method is used as a compressing method.

According to the above constitution, the decoded image data D12 being the image data decoded is compressed by the two-pixel averaging processing to be stored in the frame memory 14 if necessary, so that the decoding apparatus which can improve the picture quality of the reproduced image after extension while obtaining the same effects as the decoding apparatus 1 of the first embodiment can be realized.

(3) The Third Aspect of the Implementation (3-1) The Constitution of the Decoding Apparatus According to the Third Embodiment In FIG. 1, symbol 50 shows a decoding apparatus according the third embodiment as a whole, which is constituted same as the decoding apparatus 1 of the first embodiment, excepting the compositions of the image compression processing unit 51 and the image extension processing unit 52.

In this case, in the image compression processing unit 51 of the third embodiment, the decoded image data D12 is compressed by the image compression processing in accordance with the 2:1 one-dimensionally finite impulse response (FIR) low pass filter compressing method.

Figure 8A:
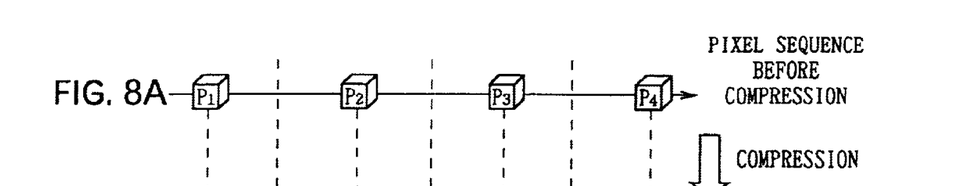
FIGS. 8A and 8B are concept diagrams explaining the image compression processing in accordance with the 2:1 one-dimensionally FIR low pass filter compressing method.

The image compressing processing according to the one-dimensionally FIR low pass filter compressing method is performed, in such a way that the pixel values of pixels $P_0$, $P_1$, $P_2$, $P_3$, . . . which are lined on a one-dimensional plane as shown in FIG. 8A and a finite number of filter coefficients are multiplied symmetrically with its position at pixels after compression $P_{C0}$, $P_{C1}$, . . . being centered so as to be normalization-superposed, and the result is set to the values of the pixels $P_{C0}$, $P_{C1}$, . . . at the center position.

Figure 9A:
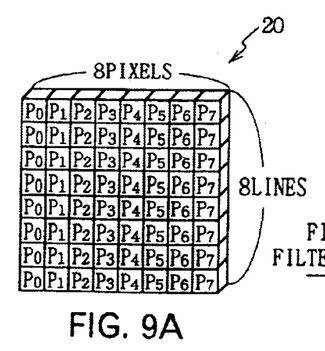
FIGS. 9A and 9B are concept diagrams explaining the image compression processing in accordance with the 2:1 one-dimensionally FIR low pass filter compressing method.
Figure 9B:
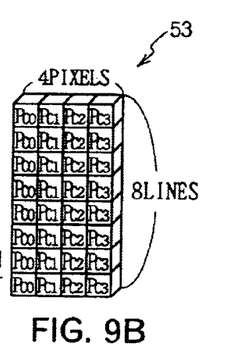

According to this method, applying the low pass filter to the frequency band in the horizontal direction of eight pixels×eight lines block 20 as shown in FIG. 9A, the number of horizontal pixels of the block 20 can be reduced to ½ as shown in FIG. 9B.

At this time, each filter coefficients is determined by a sampling frequency, a cut-off frequency, the number of tap, a roll-off ratio, etc.

Figure 8B:
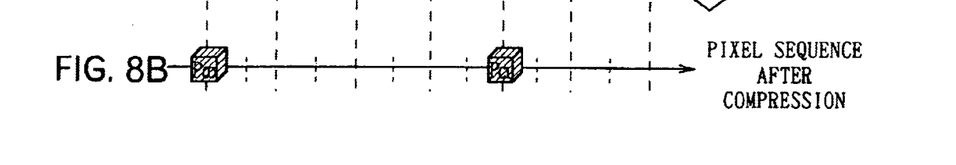

In this embodiment, the number of tap in the one-dimensionally FIR low pass filter compression processing is selected to three taps not to exceed the number of horizontal pixels of the block 20 before compression. Thereby, the effect to avoid the drift noise can be obtained. Also, as shown in FIGS. 8A and 8B, the sampling frequency is set to 2×4=8, by dividing the pixel interval before compression into two intervals and dividing the pixel interval after compression into four intervals.

Figure 10:
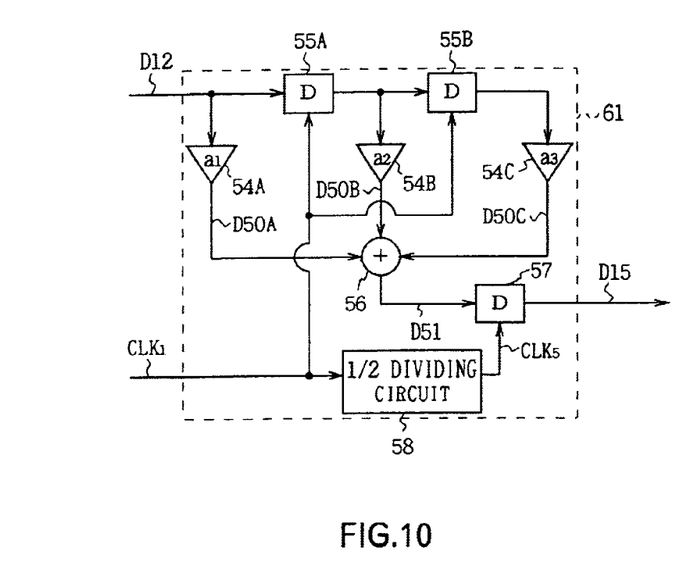
FIG. 10 is a block diagram showing the constitution of the image compression processing according to the third embodiment.

Practically, the image compression processing unit 51 according to this embodiment is constituted as shown in FIG. 10. The decoded image data D12 supplied from the addition processing unit 8 through the first processing switch unit 11 is input to a first multiplying circuit 54A.

The decoded image data D12 is supplied to a second multiplying circuit 54B after being delayed for one clock of the reference clock $CLK_1$ supplied from the clock source at a first delay circuit 55A per pixel, and the decoded image data D12 is also supplied to a third multiplying circuit 54C after being further delayed for one clock of the reference clock $CLK_1$ at a second delay circuit 55B per pixel.

In the first to third multiplying circuits 54A to 54C, the supplied decoded image data D12 per pixel is multiplied by the predetermined filter coefficient values "$a_1$", "$a_2$", "$a_3$", respectively. The multiplied results are output to an adding circuit 56 as the first to third multiplied data D50A to D50C. Note that the filter coefficient values $a_1$, $a_2$, $a_3$ are selected so that the total of these values becomes "1".

The adding circuit 56 successively adds the supplied first to third multiplied data D50A to D50C per pixel, and the obtained added data D51 is output to a second delay circuit 57.

The second delay circuit 57 successively and selectively stores the pixel data of the pixel every eight pixels (respective pixels are obtained by being normalization-superposed, symmetrically multiplying with the positions of the original even-numbered pixels $P_0$, $P_2$, $P_4$, $P_6$ being centered.), among the pixel data for 32 pixels that the pixel data for eight pixels in the horizontal direction of each block 20 (FIG. 9A) obtained based on the supplied added data D51 is over-sampled into four times. At the same time, this is successively read out based on the read clock $CLK_5$ that the reference clock $CLK_1$ supplied from a ½ dividing circuit 58 is divided into ½ cycle.

As a result, from the second delay circuit 57, the data of four lines×eight lines block 53 as shown in FIG. 9B which is obtained by reducing the number of horizontal pixels into ½ for each block 20 by the 2:1 one-dimensionally FIR low pass filter compressing method is output, based on the data of eight pixels×eight lines block 20 as shown in FIG. 9A. This is sent to the memory control processing unit 13 (FIG. 1) as the above-mentioned compressed decoded image data D15.

In the image compression processing unit 51, the size of the decoded image data D12 is reduced to a half per block, so that the decoded image data D12 can be totally compressed to ½ in its size.

On the other hand, in the image extension processing unit 52, the compressed reference image data and the outside output compressed image data are extended by the image extension processing in accordance with the 1:2 one-dimensionally FIR low pass filter extending method.

Figure 11A:
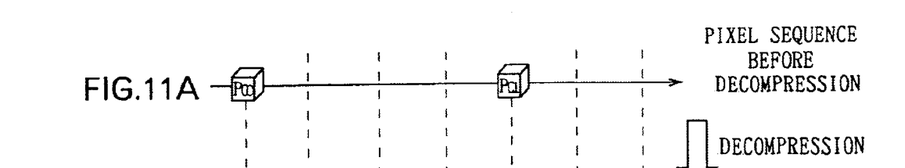
FIGS. 11A and 11B are concept diagrams explaining the image extension processing in accordance with the 1:2 one-dimensionally FIR low pass filter extending method.

The image extension processing according to the 1:2 one-dimensionally FIR low pass filter extending method, same as the image compression processing according to the one-dimensionally FIR low pass filter compressing method, is performed, in such a way that the pixel values of pixels $P_{C0}$, $P_{C1}$, . . . which are lined on a one-dimensional plane as shown in FIG. 11A and a finite number of filter coefficients are multiplied symmetrically with its position at pixels after extension $P_0$, $P_1$, $P_2$, $P_3$, . . . , being centered so as to be normalization-superposed, and the result is set to the values of the pixels $P_0$, $P_1$, $P_2$, $P_3$, . . . of the center position.

Figure 12A:
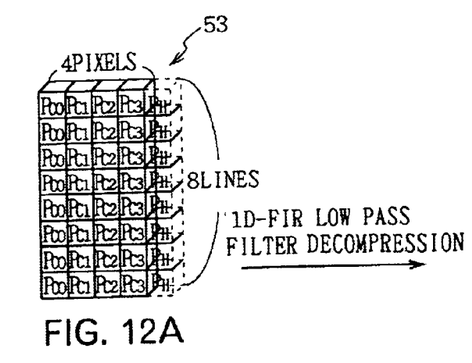
FIGS. 12A and 12B are concept diagrams explaining the image extension processing in accordance with the 1:2 one-dimensionally FIR low pass filter extending method.

According to this method, applying the low pass filter to the frequency band in the horizontal direction of the four lines×eight lines block 53 as shown in FIG. 12A, the number of horizontal pixels of the block 53 can be extended double.

At this time, each filter coefficients used for the 1:2 one-dimensionally FIR low pass filter extending method is determined by a sampling frequency, a cut-off frequency, the number of tap, a roll-off ratio, etc.

Figure 11B:
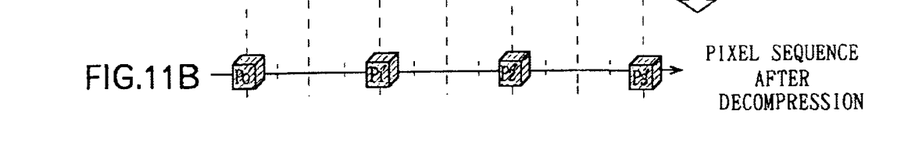

In this embodiment, the tap number of the 1:2 one-dimensionally FIR low pass filter processing is selected to three taps not to exceed the number of horizontal pixels of the block 20, 20″ before compression and before extension. Thereby, the effect to avoid the drift noise can be obtained. Also, as shown in FIGS. 11A and 11B, the sampling frequency is set to 2×4=8, by dividing the pixel interval before extension into four intervals and dividing the pixel interval after extension into two intervals.

Figure 13:
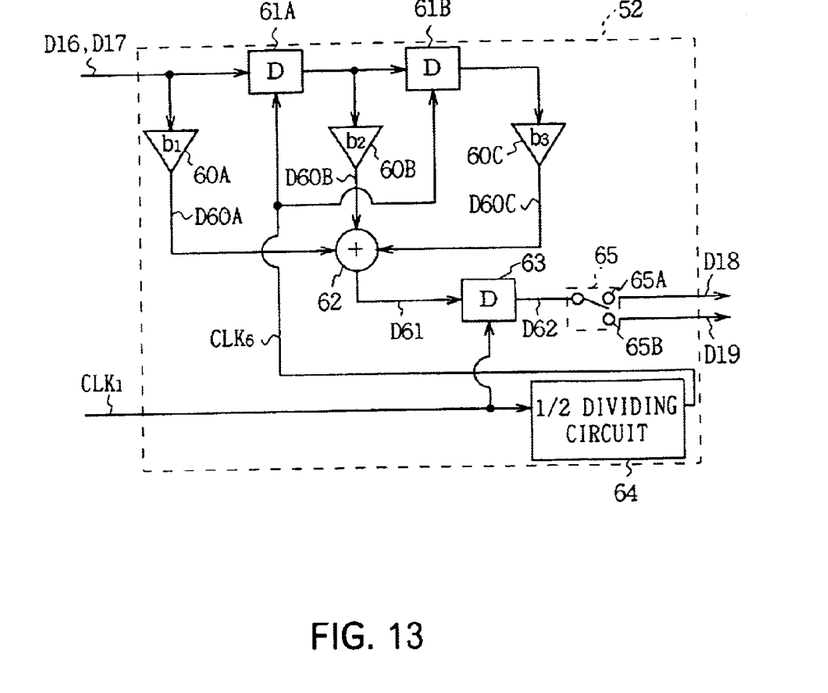
FIG. 13 is a block diagram showing the constitution of the image extension processing unit according to the third embodiment.

Practically, the image extension processing unit 52 according to this embodiment is constituted as shown in FIG. 13. The compressed reference image data D16 and the outside output compressed image data D17 supplied from the memory control processing unit 13 through the second processing switch unit 15 are input to a first multiplying circuit 60A.

The compressed reference image data D16 and the outside output compressed image data D17 are supplied to a second multiplying circuit 60B after being delayed for one clock of the reference clock $CLK_1$ output from the clock source at a first delay circuit 61A per pixel. At the same time, the compressed reference image data D16 and the outside output compressed image data D17 are also supplied to a third multiplying circuit 60C after further being delayed for one clock of the reference clock $CLK_1$ at a second delay circuit 61B per pixel.

In the first to third multiplying circuits 60A to 60C, the supplied compressed reference image data D16 and the outside output compressed image data D17 per pixel are multiplied by the predetermined filter coefficient values "$b_1$", "$b_2$", "$b_3$", respectively. The multiplied results are output to the adding circuit 62 as the first to third multiplied data D60A to D60C. Note that the filter coefficient values $b_1$, $b_2$, $b_3$ are selected so that the total of these values becomes "1".

The adding circuit 62 successively adds the supplied first to third multiplied data D60A to D60C per pixel, and the obtained added data D61 is output to a second delay circuit 63.

The second delay circuit 63 successively and selectively stores the pixel data of the pixel every eight pixels from the initial pixel $P_{C0}$, among the pixel data for 32 pixels that the pixel data for four pixels in the horizontal direction of each block 53 before extension obtained based on the supplied added data D61 is over-sampled into eight times. This is successively read out based on the read clock $CLK_1$.

Figure 12B:
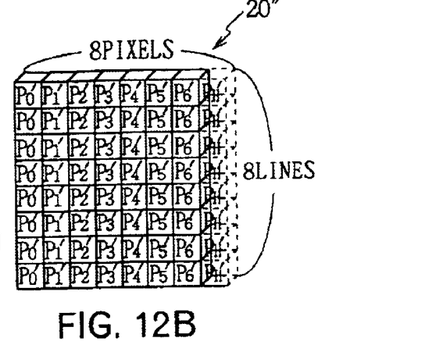

As a result, from the second delay circuit 63, the data of eight pixels×eight lines block 20″ as shown in FIG. 12B which is obtained by increasing the pixel number in the horizontal direction double for each block 53 by the 1:2 one-dimensionally FIR low pass filter extension is output, based on the data of four lines×eight lines block 53 as shown in FIG. 12A. This is output to a switch circuit 65 as the extended image data D62.

The switch circuit 65, under the control of the control unit, selects a first switch terminal 65A or a second switch terminal 65B, to selectively output the extended image data D62 that the compressed reference image data D16 is extended from the first switch terminal 65A as the reference image data D18, and at the same time, to selectively output the extended image data D62 that the outside output compressed reference image data D17 is extended from the second switch terminal 65B as the reproduction image data D19.

When the Half Pel calculation is executed in the motion compensation processing, the pixel data of the pixel $P_H$ being the first pixel of the adjacent block 20 indicated by a broken line in FIG. 12A is sparely read out from the frame memory 14 for each horizontal direction of the block 20 before extension, and this is supplied to the image extension processing unit 52 through the memory control processing unit 13 and the second processing switch unit 15.

In the image extension processing unit 52, the ninth pixel $P_H'$ in the horizontal direction of the block 20″ after extension is generated in the same way described above, based on the pixel data of the fifth pixel $P_H$.

Thereby, in this case, the data of nine pixels×eight lines block 20″ as shown in FIG. 12B is generated from the five lines×eight lines block 20 as shown in FIG. 12A in the image extension processing unit 52. This is output to the motion compensation processing unit 9 as the above-mentioned reference image data D18.

(3-2) Operation and Effects of the Embodiment

In the above constitution, in the decoding apparatus 50, in the normal mode, the decoded image data D12 being the image data decoded is stored in the frame memory 14 as it is to be used for the motion compensation processing, and is read out with the original rearrangement of image to be output to the outside as the reproduced image data D13. On the other hand, in the compression mode, the decoded image data D12 is compressed by the 2:1 one-dimensionally FIR low pass filter compressing method and stored in the frame memory 14, and extended by the 1:2 one-dimensionally FIR low pass filter extending method to be used for the motion compensation processing, and is read out with the original rearrangement of image and extended by the 1:2 one-dimensionally FIR low pass filter extending method, thereafter this is output to the outside as the reproduced image data D19.

Accordingly, in the decoding apparatus 50, as the same as the decoding apparatus 1 of the first embodiment, the whole constitution of the apparatus can be prevented from being complicated, and the encoded data D1 from high level to low level can be decoded while reducing the size of the frame memory 14 efficiently.

Further, in the decoding apparatus 50, the 2:1 one-dimensionally FIR low pass filter compressing method is used as a method of compressing the decoded image data D12 in the image compression processing unit 51, and the 1:2 one-dimensionally FIR low pass filter extending method is used as a method of extending the compressed reference image data D16 and the compressed decoded image data D17, so that the picture quality of the reproduced image after the extension can be improved, comparing to the case where the simple decimating method or the two-pixel round averaging method is used as an image compressing method and the simple extending method is used as an image extending method.

According to the above construction, the decoded image data D12 being the image data decoded is compressed by the 2:1 one-dimensionally FIR low pass filter compressing method if necessary, to be stored in the frame memory 14, and this is extended by the 1:2 one-dimensionally FIR low pass filter extending method to be used for the motion compensation processing and output to the outside, so that the decoding apparatus which can remarkably improve the picture quality of the reproduced image after extension while obtaining the same effects as the decoding apparatus 1 of the first embodiment, comparing to the first and second decoding apparatuses 1, 40, can be realized.

(4) Other Embodiments

The above described first to third embodiments have been dealt with a case where this invention is applied to the decoding apparatuses 1, 40, 50 for decoding encoded data D1 based on the MPEG2 standard. However, the present invention is not limited to this, but is widely applicable to other decoding apparatuses for decoding video data encoded based on the other various encoding methods.

In this case, the above described first to third embodiments have been dealt with a case where the decoding part 2 which is decoding means for decoding encoded data by the decoding processing based on the image data stored in storing means is constituted as shown in FIG. 1. However, the present invention is not limited to this, but in short, the decoding means may be constituted so as to decode the encoded data in accordance with the encoding method of the supplied encoded data D1.

Further, the above described first to third embodiments have been dealt with a case where the image compression processing units 16, 41, 51 which are compressing means for compressing the decoded image data D12 output from the addition processing unit 8 to be supplied to the frame memory 14 are constructed as shown in FIGS. 3, 7, 10. However, the present invention is not limited to this, but is widely applicable to other various constructions.

In this case, the compressing means can be constructed to compress the decoded image data D12 by the compressing method other than the simple decimating method, the two-pixel round averaging method, or the 2:1 one-dimensionally FIR low pass filter compressing method. Also, the compressing means can be constructed to compress the decoded image data D12 to the size of data other than ½.

Further, the above described first to third embodiments have been dealt with a case where the image extension processing units 17, 52 which are extending means for extending the compressive reference image data D16 and the outside output compressive image data D17 being the compressed decoded image data D12 stored in the frame memory 14 to be supplied to the motion compensation processing unit 9 are constructed as shown in FIGS. 5 and 13. However, the present invention is not limited to this, but is widely applicable to other various constructions.

In this case, the extending means can be constructed to extend the compressive reference image data D16 and the outside output compressive image data D17 by the extending methods other than the simple extending method or the 1:2 one-dimensionally FIR low pass filter extending method.

Further, the above described first to third embodiments have been dealt with a case where, in the image storage and output processing part 10, the decoded image data D12 is extended by the simple extending method when it is compressed by the simple compressing method and the two-pixel round averaging method, while the decoded image data D12 is extended by the one-dimensionally FIR low pass filter extending method when it is compressed by the one-dimensionally FIR low pass filter compressing method. However, the present invention is not limited to this, but the decoded image data D12 can be compressed by the simple compressing method and the two-pixel round averaging method and extended by the one-dimensionally FIR low pass filter extending method, or the decoded image data D12 can be compressed by the one-dimensionally FIR low pass filter compressing method and extended by the simple extending method. Moreover, the image storage and output processing unit 10 can be constructed to allow these compressing methods and these extending methods to be switched if necessary.

Further, the above described first to third embodiments have been dealt with a case where the image storage and output processing part 10 is provided with the first processing switch unit 11 which is the first switching means for outputting the decoded image data D12 output from the decoding part 2 to either of the memory control processing unit 13 or the image compressing part 16, 41, 51, the second processing switch unit 15 which is the second switching means for outputting the reference image data D14 or the compressive reference image data D16 read out from the frame memory 14 to either of the motion compensation processing unit 9 or the image extension processing unit 17, 52, and the controlling part 12 which is the controlling means for controlling the switching of the first and second processing switch units 11, 15. However, the present invention is not limited to this, but the image storage and output processing part 10 can be constructed, in such a way that the first and second processing switch units 11, 15, and the controlling part 12 are omitted, and the decoded image data D12 output from the decoding part 2 is constantly stored in the frame memory 14 after compressed in the image compression processing unit 16, 41, 51, and at the same time, the compressed decoded image data D12 is constantly extended in the image extension processing unit 17, 52 to be supplied to the motion compensation processing unit 9.

As described above, according to this invention, a decoding apparatus for decoding encoded data by a predetermined decoding processing comprises: storing means for storing image data obtained by decoding the encoded data; decoding means for decoding the encoded data by a decoding processing based on the image data stored in the storing means; compressing means for compressing the image data decoded by the decoding means to be supplied to the storing means; and extending means for extending the image data compressed by the compressing means which has been stored in the storing means to be supplied to the decoding means. Thereby, the constitution of the whole apparatus can be prevented from being complicated and can deal with the decoding processing of encoded data from high level to low level, so that the decoding apparatus which improves the functionality and simplifies the constitution can be realized.

Further, in this invention, a decoding method for decoding encoded data by a predetermined decoding processing compresses: a first step for storing image data obtained by decoding the encoded data in the storing means; and a second step for extending the compressed image data stored in the storing means and for decoding the encoded data by a decoding processing based on the extended image data. Thereby, the constitution of the whole apparatus can be prevented from being complicated and can deal with the decoding processing of encoded data from high level to low level, while reducing the storage size of the storing means efficiently, so that the decoding method which improves the functionality and simplifies the constitution can be realized.

While there has been describe in connection with the preferred embodiments of the invention, it will be obvious to those skilled in the art that various changes and modifications may be aimed therefore, to cover in the appended claims all such changes and modifications as fall within the true spirit and scope of the invention.

What is claimed is:

1. Decoding apparatus comprising:
    a decoder for performing motion compensation processing of input encoded image data with the use of reference image data, to provide locally decoded data;
    a compressor for compressing said locally decoded data;
    a memory for storing said compressed decoded data; and
    a decompressor for reading and decompressing said compressed decoded data stored in said memory, and supplying said decompressed data to said decoder as said reference image data for use in said processing by said decoder.

2. The decoding apparatus according to claim 1, further comprising a switching part for bypassing said compressor and said decompressor when the input encoded image data is determined to have an amount of data per unit frame that is lower than a predetermined threshold, whereby said locally decoded data is stored in said memory without being compressed when the amount of input image data per frame is below said threshold.

3. A decoding apparatus for decoding encoded data by predetermined decoding processing, comprising:
    memory for storing image data obtained by decoding said encoded data;
    decoder for performing motion compensation processing of said encoded data based upon said image data stored in said memory and for outputting decoded image data;
    compressor for compressing said decoded image data output from said decoder and for supplying the compressed image data to said memory; and
    decompressor for decompressing said image data which is stored in said memory and which is compressed by said compressor and for supplying the decompressed image data to said decoder;
    whereby the decompressed image data is used as reference image data to perform said processing by said decoder.

4. The decoding apparatus according to claim 3, further comprising:
    first switch for outputting said image data output from said decoder to either of said memory or said compressor;
    second switch for outputting said image data read out from said memory to either of said decompressor or said decoder; and
    controller for controlling said first and second switches;
    wherein said controller, based on an externally provided instruction or a program previously set, in a normal mode, controls said first switch to output said image data to said memory and controls said second switch to output image data read out from said memory to said decoder, while in the compression mode, controls said first switch to output said image data to said compressor and controls said second switch to output said image data read out from said memory to said decompressor.

5. The decoding apparatus according to clam 3, wherein said compressor compresses said image data output from said decoder by decimating the data of pixels in the horizontal direction in a predetermined block unit.

6. The decoding apparatus according to claim 3, wherein said compressor compresses said image data output from said decoder by round-averaging respective pixel data values for a plurality of adjacent pixels in the horizontal direction in a predetermined block unit.

7. The decoding apparatus according to claim 3, wherein said compressor compresses said image data output from decoder by reducing, with frequency band limiting, the number of pixels in the horizontal direction in a predetermined block unit, in accordance with one-dimensionally finite impulse response low pass filter compression processing.

8. The decoding apparatus according to claim 7, wherein in said compressor, the number of filter taps of the one-dimensionally finite impulse response low pass filter compression processing is selected to a value which does not exceed said number of pixels in the horizontal direction of said predetermined block before compression.

9. The decoding apparatus according to claim 3, wherein said decompressor decompresses said image data which is read out from said memory and which is compressed by said compressor by repeatedly outputting the pixel data of each pixel in the horizontal direction several times in a predetermined block unit.

10. The decoding apparatus according to claim 3, wherein said decompressor decompresses said image data which is read out from said memory and which is compressed by said compressor by increasing, by limiting the frequency band, the number of pixels in the horizontal direction in a predetermined block unit, in accordance with one-dimensionally finite impulse response low pass filter decompression processing.

11. The decoding apparatus according to claim 10, wherein in said decompressor, the number of filter taps of the one-dimensionally finite impulse response low pass filter decompression processing is selected to a value which does not exceed said number of pixels in the horizontal direction of said predetermined block before decompression.

12. A decoding method for decoding encoded data by predetermined decoding processing, comprising the steps of:

storing in a memory image data obtained by decoding said encoded data;

performing at a decoder motion compensation processing of said encoded data based upon on said image data stored in said memory;

compressing at a compressor said image data output from said decoder;

storing the compressed image data in said memory; and decompressing at a decompressor said image data which is stored in said memory and which is compressed by said compressor and for supplying the decompressed image data to said decoder;

whereby the decompressed image data is used as reference image data to perform said processing by said decoder.

13. The decoding method according to claim 12, further comprising the steps of:

switching at a first switch said image data output from said decoder to either of said memory or said compressor;

switching at a second switch for outputting said image data read out from said memory to either of said decompressor or said decoder; and controlling said first and second switches;

wherein based on an externally provided instruction or a program previously set, in a normal mode, said first switch is controlled to output said image data to said memory and the second switch is controlled to output image data read out from said memory to said decoder, while in the compression mode, said first switch is controlled to output said image data to said compressor and said second switch is controlled to output said image data read out from said memory to said decompressor.

14. The decoding method according to claim 12, wherein said compressor compresses said image data output from said decoder by decimating the data of pixels in the horizontal direction in a predetermined block unit.

15. The decoding method according to claim 12, wherein said compressor compresses said image data output from said decoder by round-average respective pixel data values for a plurality of adjacent pixels in the horizontal direction in a predetermined block unit.

16. The decoding method according to claim 12, wherein said compressor compresses said image data output from said decoder by reducing, with frequency band limiting, the number of pixels in the horizontal direction in a predetermined block unit, in accordance with one-dimensionally finite impulse response low pass filter compression processing.

17. The decoding method according to claim 16, wherein in said compressor, the number of filter taps of the one-dimensionally finite impulse response low pass filter compression processing is selected to the value which does not exceed said number of pixels in the horizontal direction of said predetermined block before compression.

18. The decoding method according to claim 12, wherein said decompressor decompresses said image data which is read out from said memory and which is compressed by said compressor by repeatedly outputting the pixel data of each pixel in the horizontal direction several times in a predetermined block unit.

19. The decoding method according to claim 12, wherein said decompressor decompresses said image data which is read out from said memory and which is compressed by said compressor by increasing, with frequency band limiting, the number of pixels in the horizontal direction in a predetermined block unit, in accordance with the one-dimensionally finite impulse response low pass filter decompression processing.

20. The decoding method according to claim 19, wherein in said decompressor, the number of filter taps of the one-dimensionally finite impulse response low pass filter decompression processing is selected to a value which does not exceed said number of pixels in the horizontal direction of said predetermined block before compression.

21. Decoding method comprising the steps of:

performing motion compensation processing of input encoded image data with the use of reference image data, to provide locally decoded data;

compressing said locally decoded data;

storing said compressed decoded data in memory;

decompressing said compressed decoded data stored in said memory; and supplying said decompressed data as said reference image data for use in said motion compensation processing.

22. The decoding method according to claim 21, further comprising the step of:

skipping said compressing and decompressing operations when the input encoded image is determined to have an amount of data per unit that is lower than a predetermined threshold, whereby said locally decoded data is stored in said memory without being compressed when the amount of input data per unit is below said threshold.

* * * * *